(12) United States Patent
Montague et al.

(10) Patent No.: US 11,155,977 B2
(45) Date of Patent: Oct. 26, 2021

(54) PORTAL FRAME WITH LAP JOINT FOR MOMENT RESISTANCE

(71) Applicant: Simpson Strong-Tie Company Inc., Pleasanton, CA (US)

(72) Inventors: Emory Lee Montague, Pleasanton, CA (US); Travis R. Anderson, Sacramento, CA (US)

(73) Assignee: Simpson Strong-Tie Company, Inc., Pleasanton, CA (US)

( * ) Notice: Subject to any disclaimer, the term of this patent is extended or adjusted under 35 U.S.C. 154(b) by 0 days.

(21) Appl. No.: 15/963,935

(22) Filed: Apr. 26, 2018

(65) Prior Publication Data

US 2018/0313053 A1    Nov. 1, 2018

Related U.S. Application Data

(60) Provisional application No. 62/491,051, filed on Apr. 27, 2017, provisional application No. 62/581,587, filed on Nov. 3, 2017.

(51) Int. Cl.
*E02D 27/50* (2006.01)
*E04B 1/26* (2006.01)
(Continued)

(52) U.S. Cl.
CPC ............ *E02D 27/50* (2013.01); *E04B 1/0007* (2013.01); *E04B 1/2604* (2013.01); *E04B 1/2608* (2013.01);
(Continued)

(58) Field of Classification Search
CPC ................ E04B 1/2604; E04B 1/2608; E04B 2001/2644; E04B 2001/2684;
(Continued)

(56) References Cited

U.S. PATENT DOCUMENTS 1,355,657 A    10/1920    Dryfoos
2,365,501 A    12/1944    Walstrom
(Continued)

FOREIGN PATENT DOCUMENTS

EP     2769030 A1    8/2014
FR     2304732 A1    10/1976
(Continued)

OTHER PUBLICATIONS

Simpson Strong-Tie Company, Inc., *Simpson Strong-Tie Wood Construction Connectors C-2004*, 2004, pp. 48, 49 and cover page, C-2004, Simpson Strong-Tie Company, Inc., USA.
(Continued)

*Primary Examiner* — Brian D Mattei
*Assistant Examiner* — Matthew J Gitlin
(74) *Attorney, Agent, or Firm* — Charles R Cypher; James R. Cypher

(57) ABSTRACT

A lateral force resistance system for a building is provided wherein a portal frame is constructed with a lapped connection between the supported structural member and the supporting structural member and the supporting structural member is made with an elongated member that spans the width of the supporting structural member and the height of the supporting structural member.

19 Claims, 14 Drawing Sheets

(51) Int. Cl.
*E04B 1/00* (2006.01)
*E04B 1/24* (2006.01)

(52) U.S. Cl.
CPC ............... *E04B 2001/2406* (2013.01); *E04B 2001/2409* (2013.01); *E04B 2001/2415* (2013.01); *E04B 2001/2644* (2013.01); *E04B 2001/2652* (2013.01); *E04B 2001/2672* (2013.01); *E04B 2001/2684* (2013.01); *E04B 2001/2696* (2013.01)

(58) Field of Classification Search
CPC ..... E04B 2001/2696; E04B 2001/2406; E04B 2001/2415; E04B 1/0007; E04B 2001/2672; E04B 2001/2652; E04B 2001/2409; E02D 27/50
USPC ........................................................ 52/656.2
See application file for complete search history.

(56) References Cited

U.S. PATENT DOCUMENTS

| | | | |
|---|---|---|---|
| 2,666,238 A | 1/1954 | Hagedorn | |
| 2,704,868 A | 3/1955 | Danielson | |
| 2,967,332 A * | 1/1961 | Donlin | E04B 1/26 52/93.2 |
| 2,980,217 A * | 4/1961 | Etling | E06B 3/728 52/656.2 |
| 4,207,714 A * | 6/1980 | Mehls | E04B 1/0007 52/79.1 |
| 4,209,265 A | 6/1980 | Moehlenpah | |
| 4,485,598 A * | 12/1984 | Guardiani | E04B 1/34823 52/169.9 |
| 4,584,801 A * | 4/1986 | Weinberger | E04B 1/34315 403/171 |
| 4,730,971 A | 3/1988 | Lin | |
| 4,812,075 A | 3/1989 | Lavin, Sr. | |
| 5,331,786 A * | 7/1994 | Lippert | E04C 3/38 403/205 |
| 5,469,678 A * | 11/1995 | Zamerovsky | E04B 1/003 52/263 |
| 5,697,725 A * | 12/1997 | Ballash | E04B 1/2608 403/231 |
| 5,706,626 A | 1/1998 | Mueller | |
| 5,782,054 A | 7/1998 | Varoglu et al. | |
| 5,799,452 A * | 9/1998 | Moore | E04B 1/2604 52/233 |
| 6,006,487 A * | 12/1999 | Leek | E04B 1/2604 403/190 |
| 6,018,917 A | 2/2000 | Leek | |
| 6,088,989 A | 7/2000 | Matsu | |
| 6,141,927 A * | 11/2000 | Usui | E01C 9/08 403/170 |
| 6,308,469 B1 | 10/2001 | Leung | |
| 6,327,823 B1 | 12/2001 | Emms | |
| 6,453,634 B1 | 9/2002 | Pryor | |
| 6,550,200 B1 | 4/2003 | Mueller | |
| 6,560,940 B2 | 5/2003 | Mueller | |
| 6,761,001 B2 | 7/2004 | Mueller | |
| 7,065,932 B2 | 6/2006 | Roesset et al. | |
| 8,001,734 B2 | 8/2011 | Pryor | |
| 8,112,968 B1 | 2/2012 | Mueller | |
| 8,397,454 B2 | 3/2013 | Commins et al. | |
| 8,863,467 B1 * | 10/2014 | Steinberg | E04B 1/10 52/653.1 |
| 8,904,715 B2 * | 12/2014 | Preiss | E04B 1/34838 52/582.1 |
| 9,085,901 B2 | 7/2015 | Mueller | |
| 9,428,902 B1 | 8/2016 | France et al. | |
| 9,464,427 B2 | 10/2016 | Karns | |
| 2002/0002806 A1 | 2/2002 | Commins et al. | |
| 2002/0108325 A1 | 8/2002 | Hulls et al. | |
| 2003/0031077 A1 | 2/2003 | Emms | |
| 2003/0041551 A1 * | 3/2003 | Boone | E04B 1/26 52/698 |
| 2005/0005561 A1 | 1/2005 | Hanson | |
| 2005/0055897 A1 | 3/2005 | Commins | |
| 2005/0055966 A1 * | 3/2005 | Conroy | E04B 1/26 52/120 |
| 2005/0108986 A1 | 5/2005 | Cloyd | |
| 2005/0155314 A1 | 7/2005 | Banta | |
| 2005/0284084 A1 | 12/2005 | Blake, Jr. | |
| 2006/0037256 A1 | 2/2006 | Pryor | |
| 2006/0193687 A1 | 8/2006 | Ghosh | |
| 2007/0028542 A1 | 2/2007 | Lafferty, III | |
| 2007/0294967 A1 * | 12/2007 | Posselt | E04B 2/702 52/233 |
| 2008/0148678 A1 | 6/2008 | Wolf | |
| 2008/0295428 A1 | 12/2008 | Cloyd et al. | |
| 2009/0084056 A1 | 4/2009 | Robertson | |
| 2009/0205274 A1 * | 8/2009 | Loeks | E04B 2/705 52/233 |
| 2010/0018151 A1 | 1/2010 | Hiriyur | |
| 2012/0304562 A1 * | 12/2012 | Ibrahim | E04B 1/2604 52/220.1 |
| 2014/0245674 A1 * | 9/2014 | Harrison | E04B 1/26 52/204.2 |
| 2016/0376786 A1 | 12/2016 | Karns | |
| 2019/0145092 A1 * | 5/2019 | Mori | E04B 1/2604 |

FOREIGN PATENT DOCUMENTS

| | | |
|---|---|---|
| GB | 2 026 124 | 1/1980 |
| GB | 2026124 A | 1/1980 |
| GB | 2 541 174 | 2/2017 |
| JP | H08260586 A | 10/1996 |
| WO | WO 2000/50704 A1 | 8/2000 |
| WO | WO 2013/057464 A1 | 4/2013 |

OTHER PUBLICATIONS

ICBO Evaluation Service, *ES Report PFC-5929*, Nov. 1, 2002, pp. 1-8, ICBO Evaluation Service, Inc., USA.
International Code Council, *2009 International Residential Code*, 2009, p. 172, International Code Council, USA.
USP Structural Connectors, *Connectors for use with APA Portal Frame*, 2012, 2 pages, USP Structural Connectors, USA.
U.S. International Searching Authority, *Notification of Transmittal of the International Search Report and the Written Opinion of the International Searching Authority, or the Declaration*, 1 -25-2019, p. 9, Patent Cooperation Treaty, USA.
Office Action dated Jan. 11, 2016, in European Patent Application No. 12780772.5.
Combined Search and Examination Report dated Dec. 16, 2011, in Application No. GB1117949.6.
Examination Report dated Apr. 25, 2014, in Application No. GB1117949.6.
Examination Report dated Nov. 26, 2014, in Application No. GB1117949.6.
Combined Search and Examination Report dated Nov. 25, 2014, in Application No. GB1417089.8.
Examination Report dated Apr. 8, 2015, in Application No. GB1417089.8.
International Search Report and Written Opinion dated Apr. 2, 2013, in International Application No. PCT/GB2012/000794 filed Oct. 18, 2012.
International Preliminary Report on Patentability dated Apr. 22, 2014, in International Application No. PCT/GB2012/000794 filed Oct. 18, 2012.
"Wood Strong-Wall: Garage Portal Systems on Concrete Foundations," C-SW09, 08/09, front and back cover and pp. 21-43, Simpson Strong-Tie Company, Inc., Pleasanton, CA.

* cited by examiner

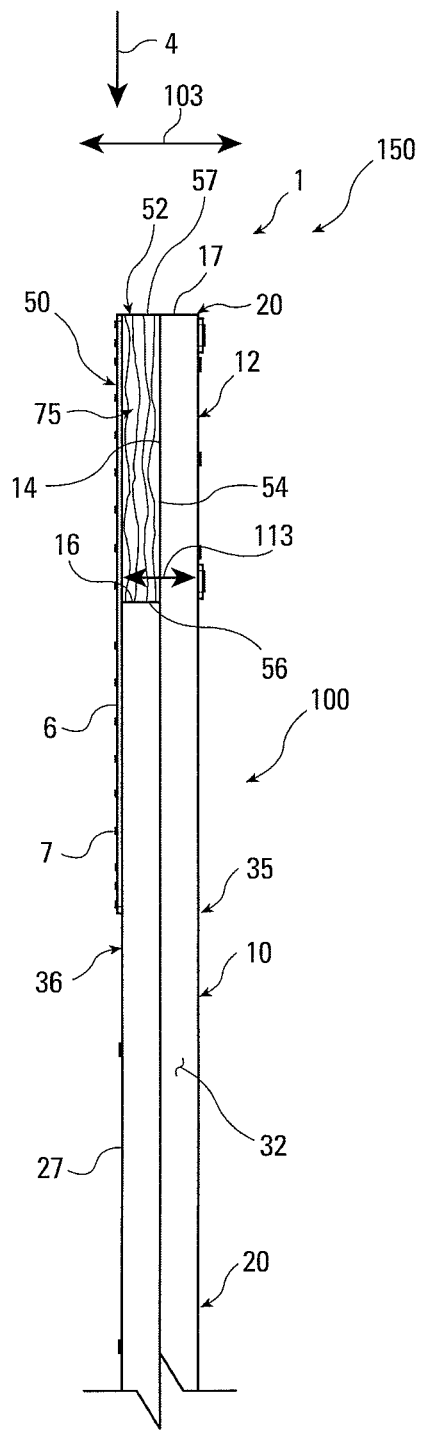
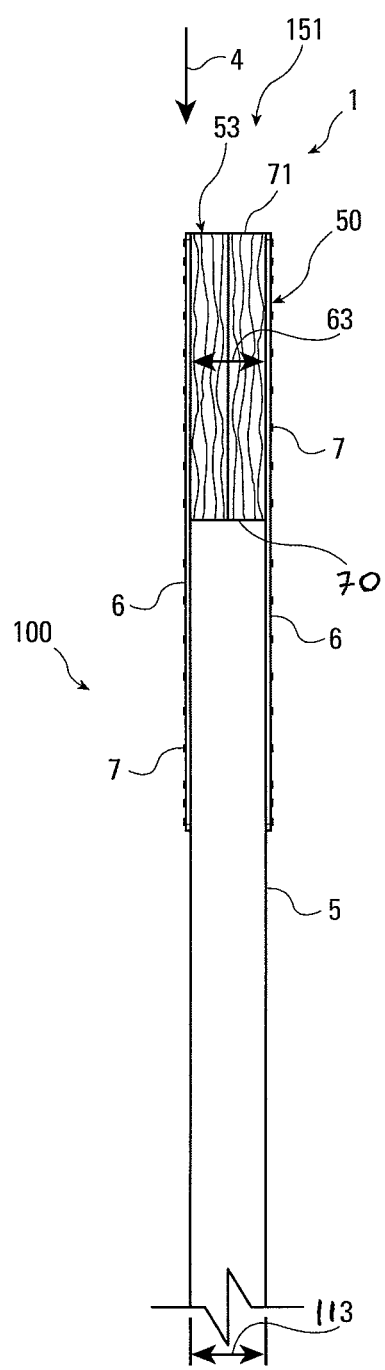
Fig. 8                    Fig. 9

PORTAL FRAME WITH LAP JOINT FOR MOMENT RESISTANCE

BACKGROUND OF THE INVENTION

This invention relates to a method and apparatus for connecting a header or beam to a panel or support to form a lateral force resisting system, typically known as a portal frame, in a building.

All structures must be designed to resist lateral forces. Lateral forces on buildings are typically produced by wind loading and seismic forces. Building components that resist lateral forces are called lateral force resisting systems. Lateral forces imposed on a structure create moment forces at the joints or connections between the vertically and horizontally disposed members of the system. These moment forces at the joints between the horizontal and vertical members are particularly pronounced in what are called portal frames. A portal frame is a lateral force resisting system where a header or beam spans an opening and is supported on either side by uprights. When the design of the building calls for a large opening in the exterior wall of a building that must be spanned by a long header or beam, such as at a garage opening, these moment forces are particularly pronounced. Designing sufficiently strong portal frames can be particularly difficult in this situation because the uprights or walls that support the header for a garage return must typically be very narrow due to space considerations.

Currently, the International Residential Code and the prescriptive portion of the International Building Code prescribe a minimum width for at least one upright of certain portal frames, if the frame is not designed by an engineer. The braced wall panel or upright of the portal frame must be at least 16 inches wide.

The present invention provides an improved portal frame that can meet the necessary lateral loading requirements with a braced wall panel or upright that is less than 16 inches wide.

SUMMARY OF THE INVENTION

It is an object of the present invention to attach a horizontally disposed member to vertically disposed member in a manner that provides a strong lap joint between the members that can carry large moment forces even though the vertical member is relatively narrow, preferably the lap joint is a half-lap type joint. In the preferred embodiment of the invention, the vertical member is only a nominal 10 to 12 inches wide, and both the vertical and horizontal members are nominal 3 inches deep. The thin depths of the horizontal and vertical members in the wall make it easy to place the invention in a standard wall and be able to provide insulating materials and typical external coverings. It is a further object of the present invention to create a strong portal frame that is easily and inexpensively formed as it is made from readily available building materials and components.

The lateral force resistance system of the present invention is provided in a building where a large opening is to be provided in the side of the building. The lateral force resistance system has a foundation which is the foundation for the building which supports and anchors the other members of the lateral resistance system. The lateral force resistance system has a supported structural member that spans the opening in the building. The supported structural member has an elongated axis with a first connection end and a second connection end disposed oppositely along the elongated axis from the first connection end. The supported structural member is operatively connected to the foundation. The supported structural member is directly connected to a supporting member by fasteners and the supporting structural member is connected to the foundation by anchors. The supporting structural member also has an elongated axis with an upper connection end and a lower basal end disposed oppositely along the elongated axis from the upper connection end. The supporting structural member is operatively connected to both the supported structural member and the foundation. The elongated, supported structural member and the elongated, supporting structural member are in direct connection with each other at the first connection end of the supported structural member and the upper connection end of the supporting structural member. The elongated axes of the supported and the supporting structural members are disposed non-parallel to each other. The supported structural member and the supporting structural member form a first side or portion of a portal frame that borders the opening in a building. The portal frame has a longitudinal axis that runs parallel to the gravitational forces exerted on the portal frame and a lateral axis orthogonal to the longitudinal axis. The lateral axis of the portal frame is in general alignment with the elongated axis of the supported structural member. The portal frame also has a depth axis orthogonal to both the lateral and longitudinal axes. The portal frame has a lateral width along the lateral axis, a longitudinal height along the longitudinal axis, and a depth along the depth axis, with the lateral width and the longitudinal height of the portal frame being much greater than the depth of the portal frame. The first connection end of the supported structural member is formed with a lapping surface that is not orthogonal to the longitudinal axis of the portal frame, and the first connection end of the supported structural member is formed with an abutment surface that is not parallel to the lateral axis of the portal frame. The supporting structural member has a lateral width along the lateral axis of the portal frame and a longitudinal height along the longitudinal axis of the portal frame, and the supporting structural member is formed with a lateral load resisting member formed from a single piece member that spans the lateral width and extends the longitudinal height, and the upper connection end of the supporting structural member is formed with a lapping surface that is not orthogonal to the longitudinal axis of the portal frame, and the upper connection end of the supporting structural members is formed with an abutment surface that is not parallel to the lateral axis of the portal frame and the lapping surface of the supporting structural member and the abutment surface of the supporting structural member are both formed on the lateral load resisting member. The lapping surface of the supported structural member and the lapping surface of the supporting structural member correspond such that the lapping surfaces are disposed adjacent to each other, and the abutment surface of the supported structural member and the abutment surface of the supporting structural member correspond such that the abutment surfaces are disposed adjacent to each other.

In the present invention, the supporting structural member can have an inner lateral side and an outer lateral side with the supported structural member extending from the supporting structural member at the inner lateral side and beginning to overlap with the supporting structural member at the inner lateral side, and the abutment surface of the supporting structural member can be disposed at the inner lateral side of the supporting structural member.

In the present invention, the lateral load resisting member can be directly anchored to the foundation at two separate points disposed laterally from each other along the lateral axis of the portal frame.

In the present invention, the lateral load resisting member can be formed with an inner side surface with the supported structural member extending from the lateral load resisting member at the inner side surface. The lateral load resisting member can also be formed such that the lateral width of the lateral load resisting member of the supporting structural member is greater than the depth of the portal frame, and the abutment surface of the supporting structural member is formed on the inner side surface of the lateral load resisting member.

In the present invention, the lapping surfaces of the supporting structural member and the supported structural member can be parallel, planar surfaces.

In the present invention, the abutment surfaces of the supporting structural member and the supported structural member can be parallel, planar surfaces.

In the present invention, the supporting structural member can have an inner lateral side and an outer lateral side with the supported structural member extending from the supporting structural member at the inner lateral side and beginning to overlap with the supporting structural member at the inner lateral side. A portion of the supported structural member does not extend past the inner lateral side of the supporting structural member, and the portion of the supported structural member that does not extend past the inner lateral side of the supporting structural member is connected to the supporting structural member with a strap.

In the present invention, the supported structural member can have a lower longitudinal side and an upper longitudinal side with the supporting structural member extending from the supported structural member at the lower longitudinal side and beginning to overlap with the supported structural member at the lower longitudinal side. A portion of the supporting structural member does not extend past the lower longitudinal side of the supported structural member, and the portion of the supporting structural member that does not extend past the lower longitudinal side of the supported structural member is connected to the supported structural member with a strap.

In the present invention, the supporting structural member can be formed from a plurality of elongated framing members joined together forming first and second layers of members of equal depth and overlying each other, and the supported structural member can be formed from a plurality of elongated framing members joined together forming first and second layers of members of equal depth and overlying each other. The first layer of the supported structural member can extend past the second layer at the connection where the supported structural member and the supporting structural member intersect, and the first layer of the supporting structural member can extend past the second layer at the connection where the supported structural member and the supporting structural member intersect.

In the present invention, the supported structural member and the supporting structural member can be joined by fasteners that are driven through the lapping surfaces of the supported structural member and the supporting structural member. The fasteners driven through the lapping surfaces of the supported structural member and the supporting structural member can be spaced from each other to form a substantially rectangular array.

BRIEF DESCRIPTION OF THE DRAWINGS

FIG. 8 is an outer side view of the connection according to the present invention of the upright panel to the header in a portal frame taken generally along the view line indicated as FIG. 8 in FIG. 1.

FIG. 9 is an outer side view of the connection of a post to the header in the portal frame shown in FIG. 1.

DETAILED DESCRIPTION

Figure 1:
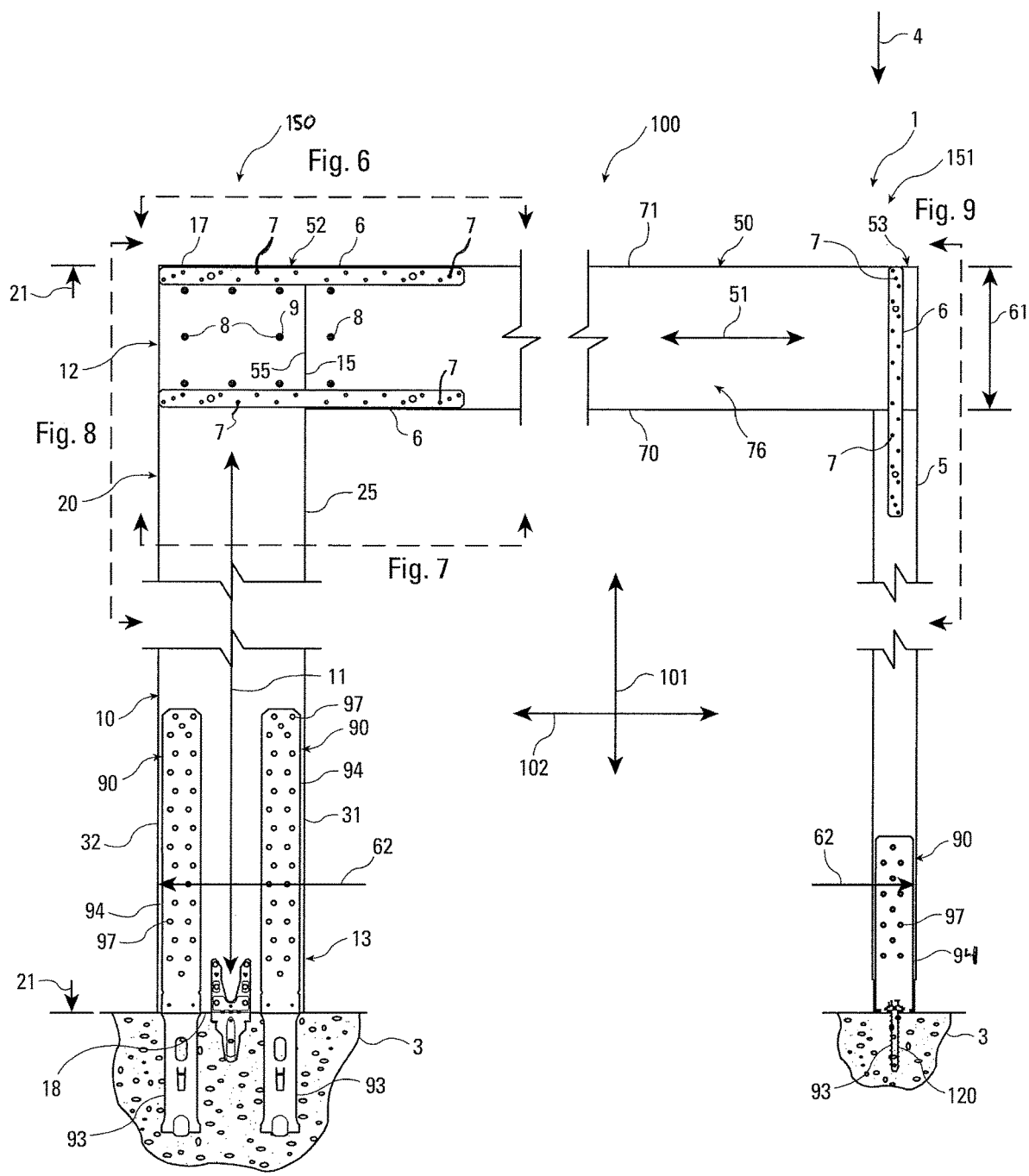
FIG. 1 is a front view of a portal frame having an supporting structural member and an upright post supporting a header or supported structural member wherein the upright panel is connected to the header according to the present invention. Portions of the foundation are omitted so as to reveal the anchor members embedded in the foundation to connect the upright panel and the post to the foundation. The particular anchor members shown securing the upright panel are strap anchors.

As shown in FIG. 1, the present invention teaches a connection for securing a vertically disposed or longitudinal supporting structural member or first structural member 10 to a horizontally disposed or lateral supported structural member 50 by overlapping the members in what is typically called a half lap joint. The supporting structural member 10 and the supported structural member 50 are part of a lateral force resistance system 1 in a building 2. The lateral force resistance system 1 includes a foundation 3 which supports and anchors the other members of the lateral force resistance system 1. Anchoring a lateral force resistance system 1 to a building's foundation 3 is a common method of resisting uplift and overturning moment forces.

The supported structural member 50, also commonly called a header, of the lateral force resistance system 1 has an elongated axis 51. At one end of the elongated axis 51, the supported structural member 50 is formed with a first connection end 52. At the other end of the elongated axis 51 the supported structural member 50 is formed with a second connection end 53. The first and second connection ends 52 and 53 are disposed oppositely from each other along the elongated axis 51. As shown in FIG. 1, the first connection end 52 is connected to supporting structural member 10 with a connection formed according to the present invention, and the second connection end 53 is connected to a typical post 5. The post 5 as shown is a typical nominal 4×4 post used in the United States. The post can also be built up 2× members. As is also shown in FIG. 1, the supported structural member 50 is positively and directly connected to the supporting structural member 10 which is positively and directly connected to the foundation 3, thus the supported structural member 10 is operatively connected to the foundation 3.

The supporting structural member 10, often commonly called an upright or braced panel, of the lateral force resistance system 1 has an elongated axis 11. At one end of the elongated axis 11, the supporting structural member 10 is formed with an upper connection end 12. At the other end of the elongated axis 11 the supporting structural member 50 is formed with a lower basal connection end 13. The first and second connection ends 12 and 13 are disposed oppositely from each other along the elongated axis 11. As is typical, the elongated axis 11 of the supporting structural member 10 is in alignment with the gravitational force 4 exerted on the building 2

As shown in FIG. 1, the supported structural member 50 is directly connected at its first connection end 52 to the upper connection end 12 of the supporting structural member 10. Typically, the elongated axes 51 and 11 of the supported and supporting structural members 50 and 10 will be disposed orthogonally to each other, although lateral force resistance systems 1 are also formed where the supported structural member 50 is disposed at an obtuse angle to the supporting structural member 10 to follow an angled roof line. The elongated axes 51 and 11 of the supported structural member and the supporting structural member do not lie in parallel, but meet at an angle.

As shown in FIG. 1, the supported structural member 50 and the supporting structural member 10 form a first side or portion 150 of a portal frame 100. The portal frame 100 has a longitudinal axis 101 that runs parallel to the gravitational force 4 exerted on the portal frame 100, a lateral axis 102 that is disposed orthogonally to the longitudinal axis 101, and a depth axis 103 that is disposed orthogonally to both the longitudinal and lateral axes 101 and 102. The lateral axis 102 of the portal frame 100 will generally be in alignment with the elongated axis 51 of the supported structural member 50. As is shown in FIG. 1, which represents a very common building situation, the two axes 51 and 102 are parallel and aligned. If the portal frame 100 is formed where the supported structural member 50 is not set orthogonally to the gravitation force 4 on the building 2, as when the supported structural member 50 follows an angled roof line, then the lateral axis 102 of the portal frame 100 is only generally in alignment with the elongated axis 51 of the supported structural member 50.

As best shown in FIGS. 1, 3, 6, 8 and 14, the portal frame 100 has a lateral width 112 along said lateral axis 112, a longitudinal height 111 along said longitudinal axis 101, and a depth 113 along said depth axis 103, with said lateral width 112 and said longitudinal height 111 of said portal frame 100 being much greater than said depth 113 of said portal frame 100.

Figure 7:
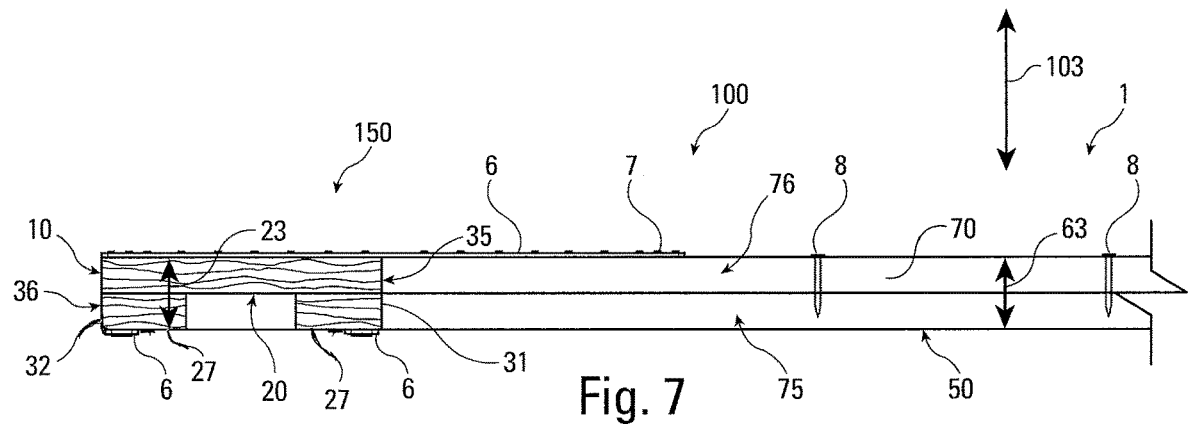
FIG. 7 is a bottom cross-sectional view of the connection according to the present invention of the upright panel to the header in a portal frame taken generally along the view line indicated as FIG. 7 in FIG. 1.

As is best shown in FIG. 7, the first connection end 52 of the supported structural member 50 is formed with a lapping surface 54 that is not orthogonal to the longitudinal axis 101 of the portal frame 100, and the upper connection end 12 of the supporting structural member 10 is formed with a lapping surface 14 that is not orthogonal to the longitudinal axis 101 of the portal frame 100. The lapping surfaces 54 and 14 of the supported structural member 50 and the supporting structural member 10 correspond such that the lapping surfaces 54 and 14 are disposed adjacent to each other. As shown in the preferred embodiment, the lapping surfaces 54 and 14 are substantially planar surfaces that closely interface with each other. The lapping surfaces 54 and 14 need not be substantially planar surfaces although it is preferred, especially given the preferred manner of forming the supported and supporting structural member 50 and 10 from a plurality of pieces of dimensional lumber with substantially planar surfaces. Preferably, the lapping surfaces 54 and 14 are orthogonal to the depth axis 103 of the portal frame 100.

As is best shown in FIG. 7, the first connection end 52 of the supported structural member 50 is formed with an abutment surface 55 that is not parallel to, but rather intersects with the lateral axis 102 of the portal frame; and the upper connection end 12 of the supporting structural member 10 is formed with an abutment surface 15 that is not parallel to, but rather intersects with the lateral axis 102 of the portal frame 100. The abutment surfaces 55 and 15 of the supported structural member and the supporting structural member 50 and 10 correspond such that the abutment surfaces are disposed adjacent to each other. As shown in the preferred embodiment, the abutment surfaces 55 and 15 are substantially planar surfaces that closely interface with each other. The abutment surfaces 55 and 15 need not be substantially planar surfaces although it is preferred, especially given the preferred manner of forming the supported and supporting structural member 50 and 10 from a plurality of pieces of dimensional lumber or laminated veneer lumber with substantially planar surfaces. The abutment surfaces 55 and 15 are preferably disposed orthogonally to the lateral axis 102 of the portal frame 100, and the depth of the abutment surfaces 55 and 15 is preferably substantially half of the depth 113 of the portal frame 100.

Figures 10, 11:
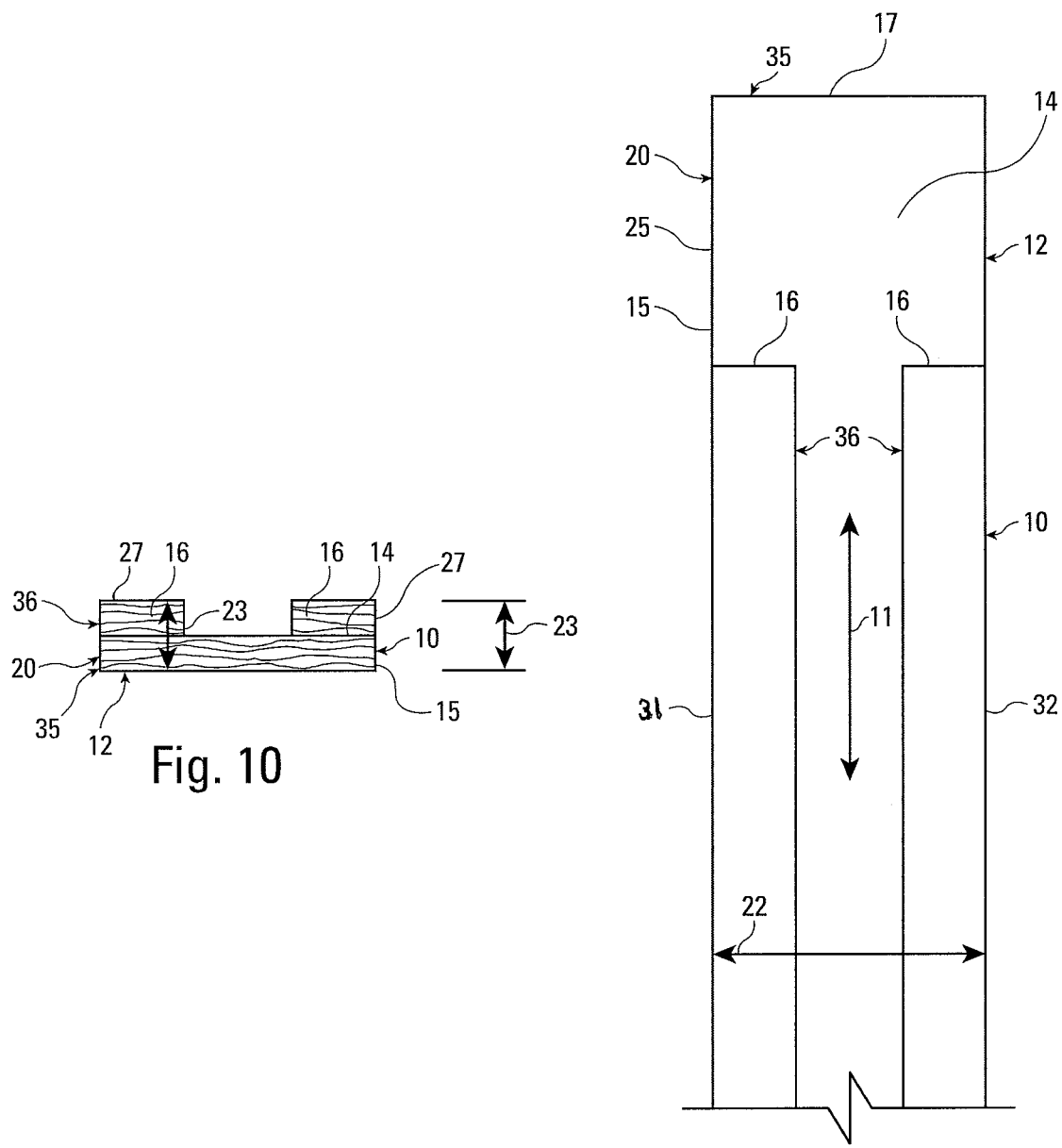
FIG. 10 is a top view of the supporting structural member of the present invention.
FIG. 11 is a back view of the supporting structural member of the present invention.
Figure 12:
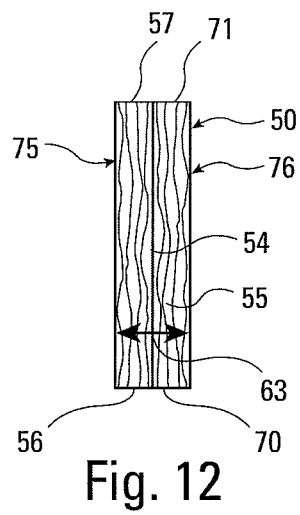
FIG. 12 is an outer side view of the supported structural member of the present invention.
Figure 13:
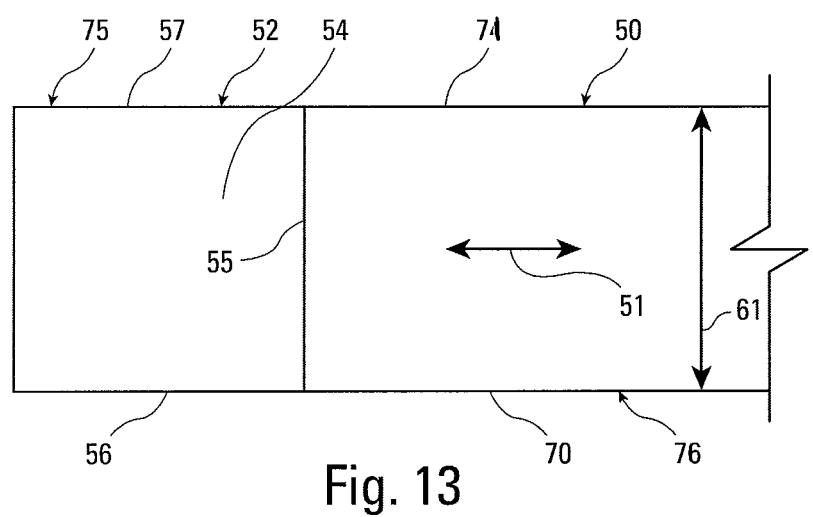
FIG. 13 is a front view of a portion of the supported structural member of the present invention.
Figure 14:
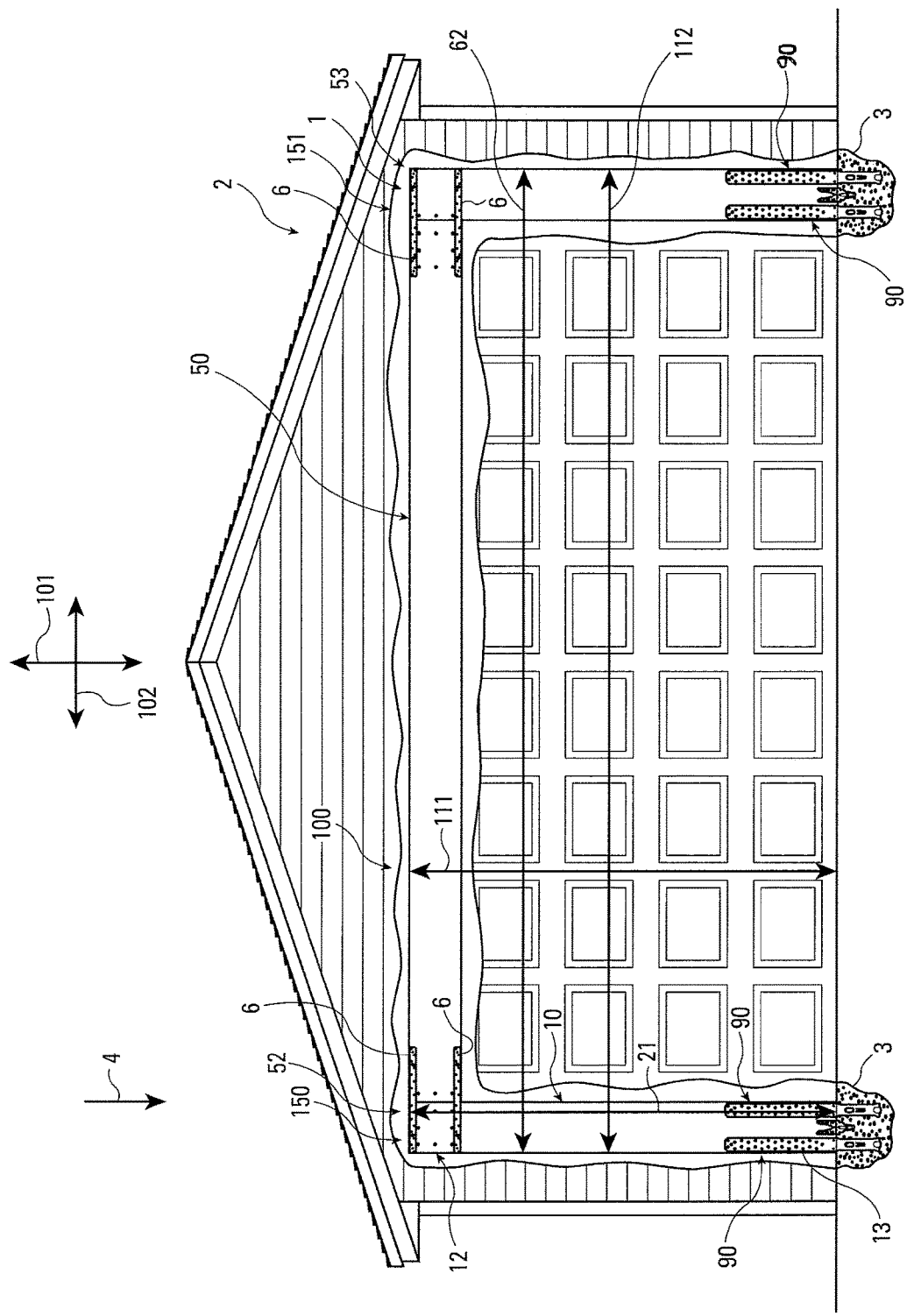
FIG. 14 is a front view of a building in which the portal frame of the present invention is used. Portions of the exterior of the building are shown as removed to reveal the portal frame of the present invention.

As is best shown in FIGS. 1, 10 and 11, the supporting structural member 10 has a longitudinal height 21 along said longitudinal axis 101 of the portal frame 101 and a lateral width 22 along the lateral axis 102 of the portal frame 100, and the supporting structural member 100 is formed with a lateral load resisting member 20 formed from a single piece member that spans the lateral width 22 and extends the longitudinal height 21, and the lapping surface 14 and the abutment surface 15 are both formed on the lateral load resisting member 20. In the preferred embodiment the lateral load resisting member 20 is formed from a single piece of wood or laminated veneer lumber and is a standard 2×12 member.

As is best shown in FIGS. 1, 10 and 11, in the preferred lateral force resisting system of the present invention, the supporting structural member 10 has an inner lateral side 31 and an outer lateral side 32 with the supported structural member 50 extending from the supporting structural member 10 at the inner lateral side 31 and beginning to overlap with the supporting structural member 10 at the inner lateral side 31, and the abutment surface 15 of the supporting structural member 10 is disposed at the inner lateral side 31 of the supporting structural member 10. The supported structural member 50 can span a distance of 18 feet from the inner lateral side 31 of the supporting structural member 10 to the inner lateral side of the supporting member such as post 5 at the second connection end 53 of the supported structural member 10.

Figure 2:
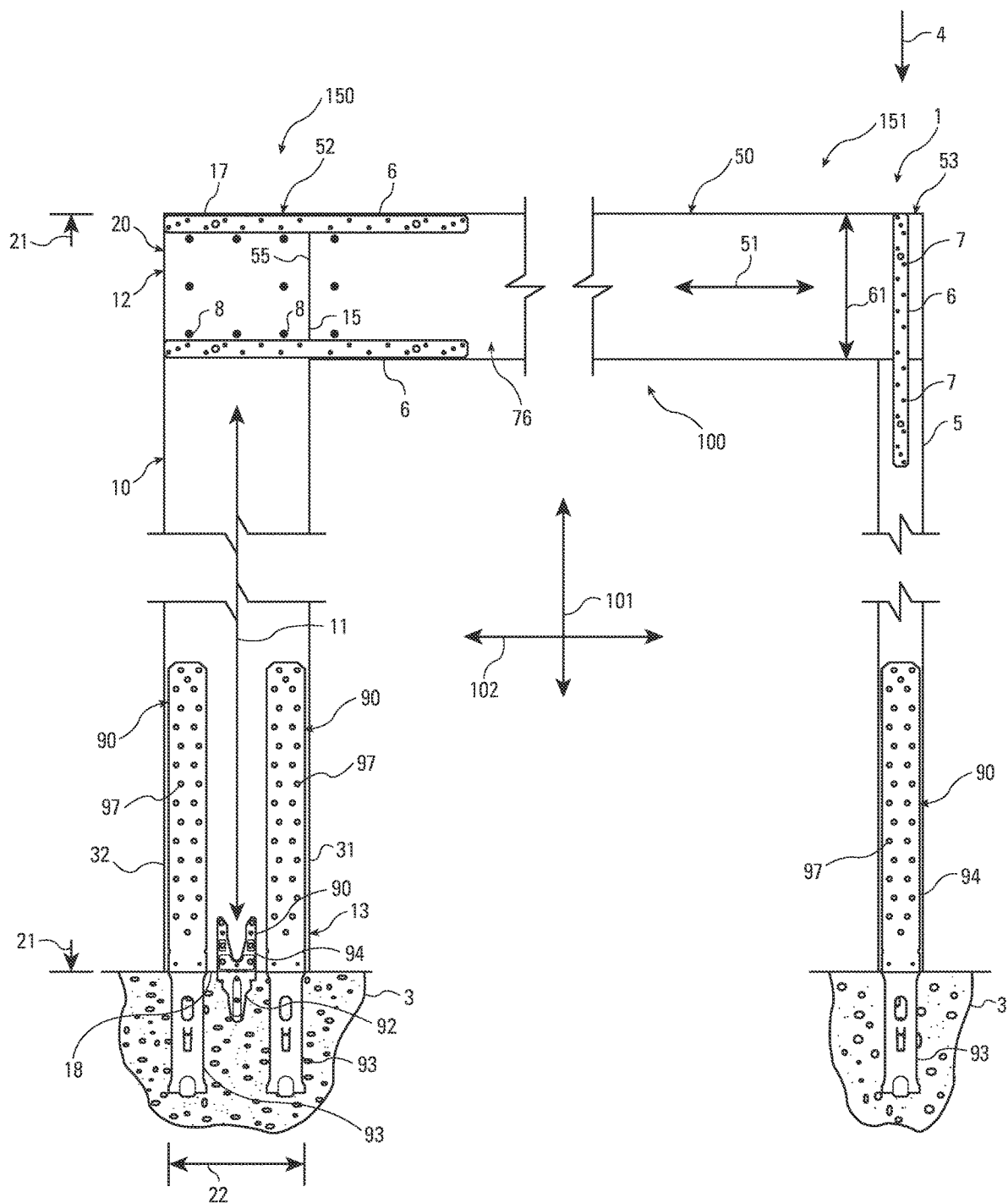
FIG. 2 is a front view of a portal frame having an supporting structural member and an upright post supporting a header or supported structural member wherein the upright panel is connected to the header according to the present invention. Portions of the foundation are omitted so as to reveal the anchor members embedded in the foundation to connect the upright panel and the post to the foundation. The particular anchor members shown securing the upright panel and the post are strap anchors.
Figure 3:
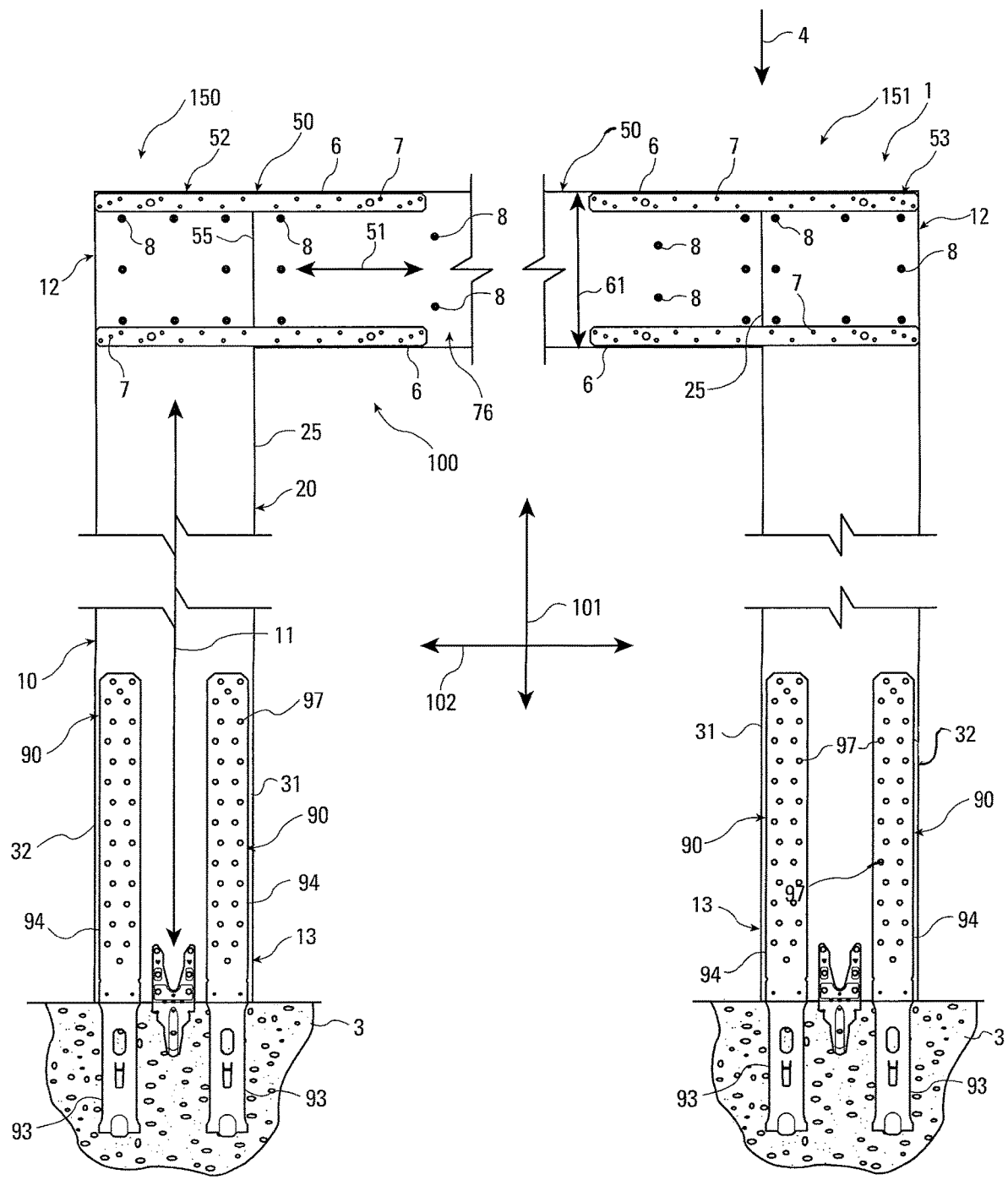
FIG. 3 is a front view of portal frame having a pair of upright panels supporting a header wherein the upright panels are connected to the header according to the present invention. Portions of the foundation are omitted so as to reveal the anchor members embedded in the foundation to connect the upright panel and the post to the foundation.

As is best shown in FIG. 1, the lateral load resisting member 20 is directly anchored to the foundation 3 at two separate points disposed laterally from each other along the lateral axis of the portal frame 102. Typical commercially available anchors 90 made from steel can achieve tension loads over 5000 pounds when used with typical wood members available in the United States and are suitable for use with the present invention. Such anchors include the STHD holdown which is available from Simpson Strong-Tie Company, Inc., and is the subject of U.S. Pat. No. 5,813,182 which is incorporated herein by reference. The anchor 90 shown in FIG. 1 for the post is commercially available from Simpson Strong-Tie Company, Inc. as an HDC holdown. As shown in FIGS. 1 and 2, the supporting structural member can be further secured to the foundation with an additional anchor 90 available from Simpson Strong-Tie Company, Inc. as a MASA anchor.

As is best shown in FIGS. 1, 6, 10 and 11, the lateral load resisting member 20 is formed with an inner side surface 25 with the supported structural member 50 extending from the lateral load resisting member 20 at the inner side surface 25. As is best shown in FIGS. 1, 6, 10 and 11, the lateral width 22 of the lateral load resisting member 20 of the supporting structural member 10 is greater than the depth 103 of the portal frame, and the abutment surface 15 of the supporting structural member 10 is formed on the inner side surface 25 of the lateral load resisting member 20.

Figure 4:
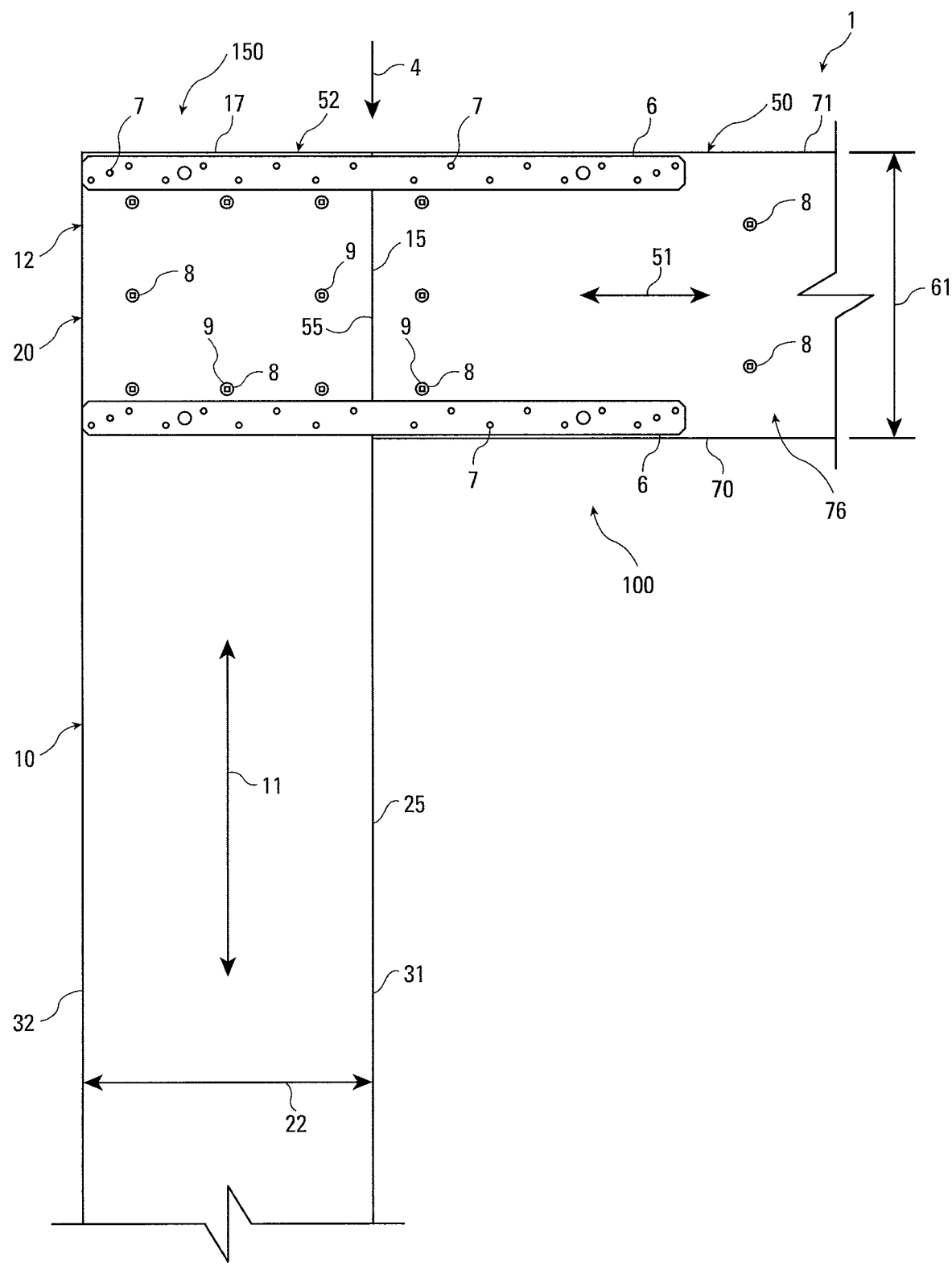
FIG. 4 is a front view of the connection according to the present invention of the upright panel to the header in a portal frame.
Figure 6:
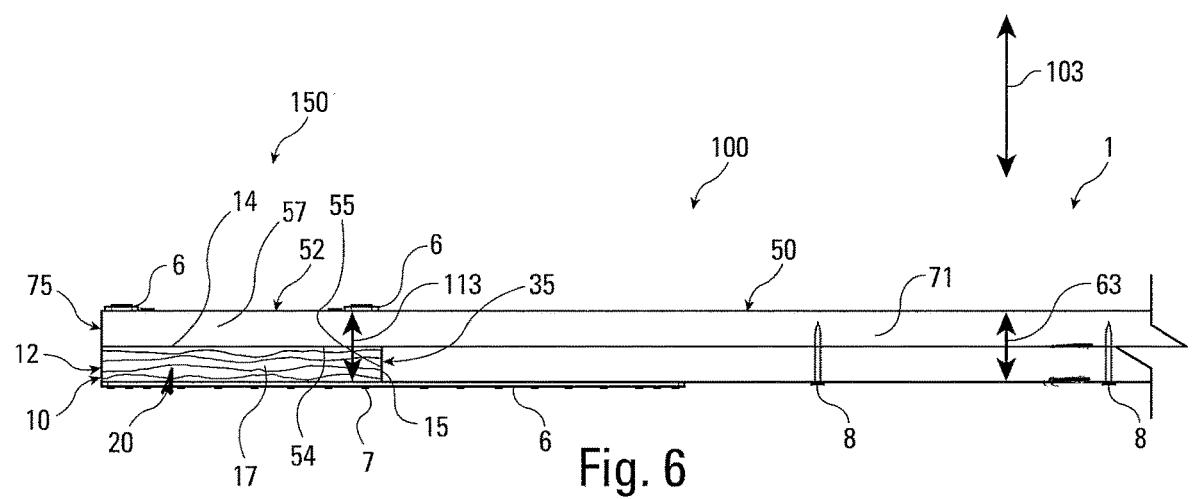
FIG. 6 is a top view of the connection according to the present invention of the upright panel to the header in a portal frame.
Figure 15:
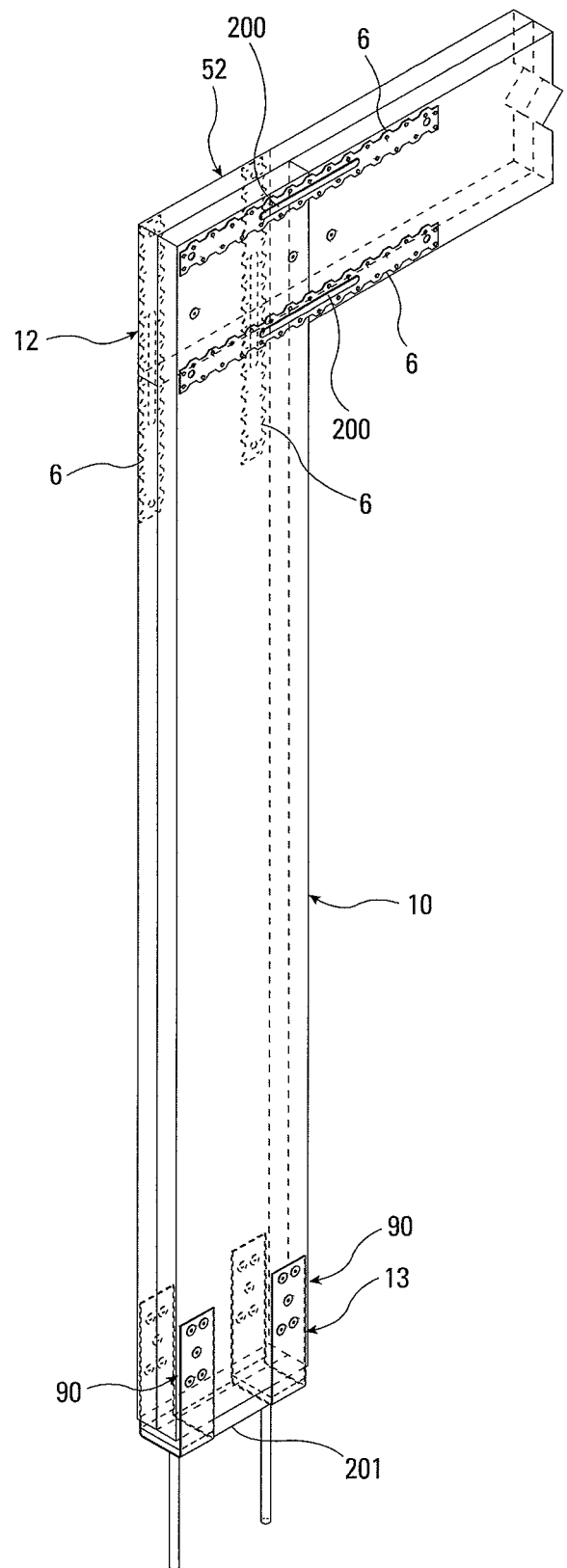
FIG. 15 is a perspective view of a portion of a portal frame having a supporting structural member supporting a header or supported structural member wherein the upright panel is connected to the header according to the present invention.
Figure 16:
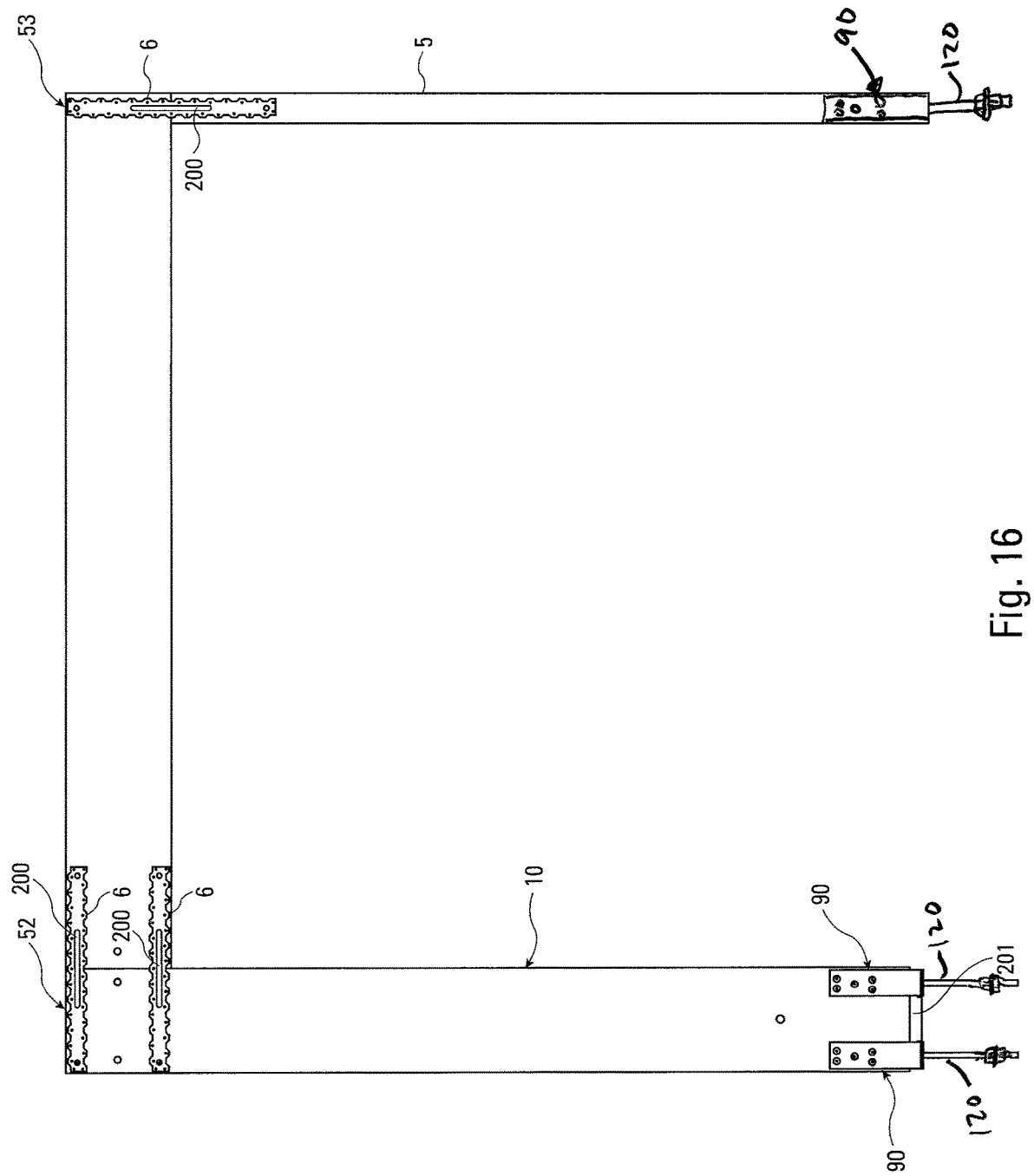
FIG. 16 is a front view of a portal frame having a supporting structural member and an upright post supporting a header or supported structural member wherein the upright panel is connected to the header according to the present invention.
Figure 17:
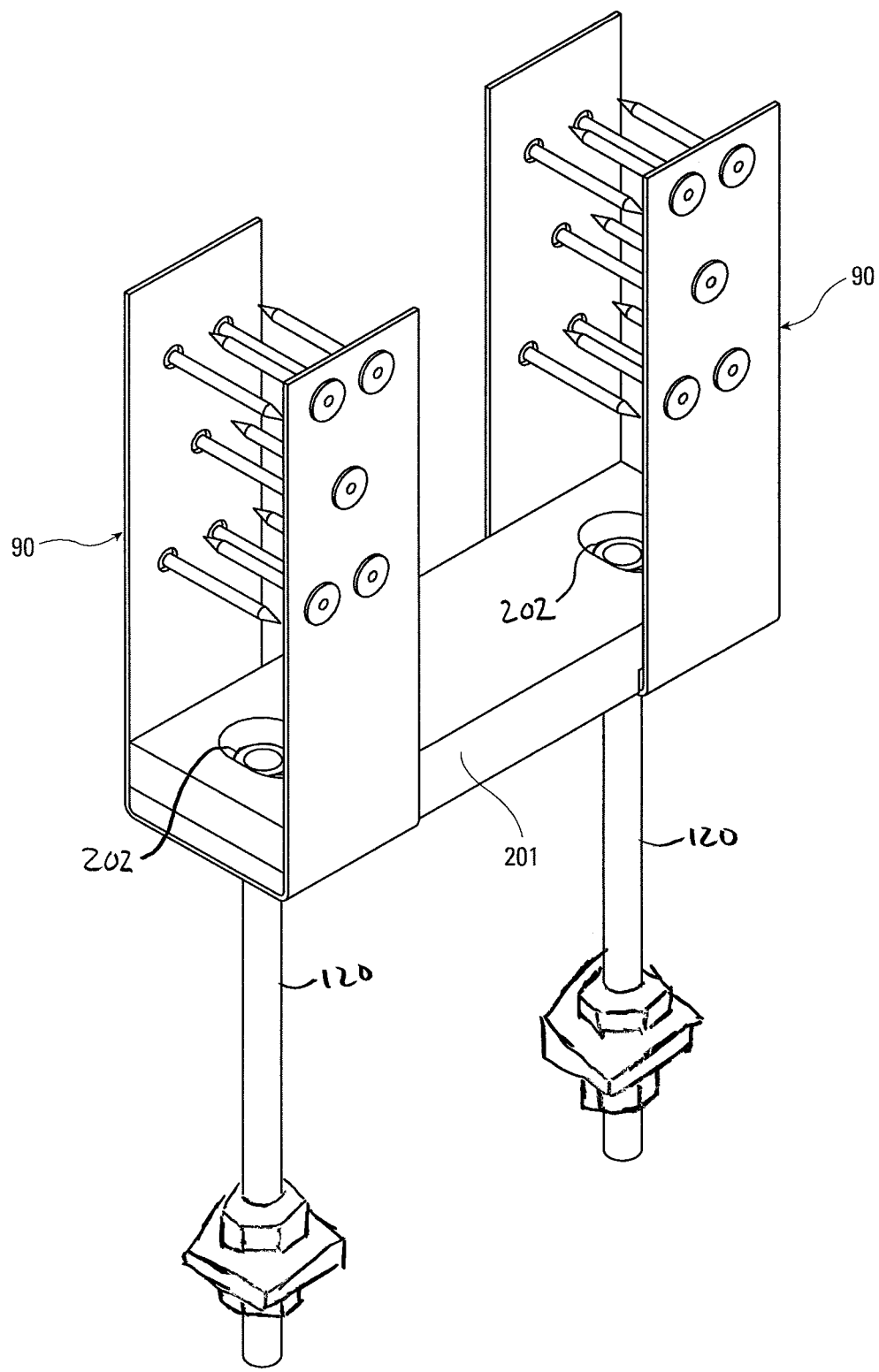
FIG. 17 is a perspective view of a stand-off member and u-shaped anchors for anchoring the supporting structural member.

As best shown in FIGS. 1, 4 and 6, the supporting structural member 10 has an inner lateral side 31 and an outer lateral side 32 with the supported structural member 50 extending from the supporting structural member 10 at the inner lateral side 31 and beginning to overlap with the supporting structural member 10 at the inner lateral side 31, a portion of the supported structural member 50 does not extend past the inner lateral side 31, and the portion of the supported structural member 50 that does not extend past the inner lateral side 31 is connected to the supporting structural member 10 with a strap 6. Preferably, the straps 6 overlie the lateral load resisting member 20. Preferably, the connection is made with two straps 6. The straps 6 are preferably fastened to the wood members with nails 7 at the uppermost and lowermost possible positions on the supported structural member 50. As shown in FIGS. 15 and 16 the strap can be provided with a central embossment 200 that extends along the longitudinal length of the strap to strengthen the strap.

Figure 5:
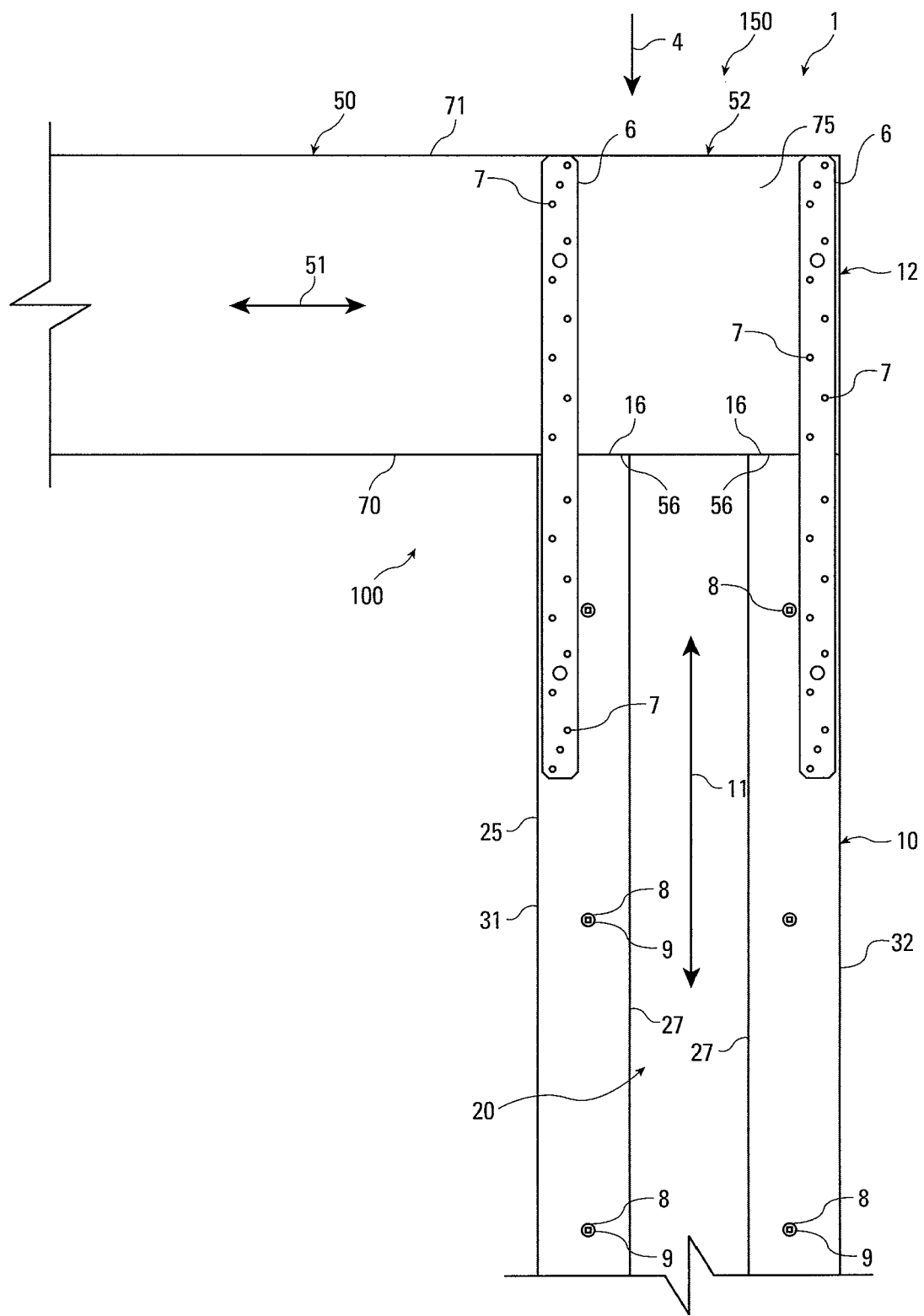
FIG. 5 is a back view of the connection according to the present invention of the upright panel to the header in a portal frame.

As best shown in FIGS. 1, 5 and 6, the supported structural member 50 has a lower longitudinal side 70 and an upper longitudinal side 71 with the supporting structural member 10 extending from the supported structural member 50 at the lower longitudinal side 71 and beginning to overlap with the supported structural 50 member at the lower longitudinal side 71, a portion of the supporting structural member 10 does not extend past the lower longitudinal side 71, and the portion of the supporting structural member 10 that does not extend past the lower longitudinal side 71 is connected to the supported structural member 50 with a strap 6. Preferably, the connection is made with two straps 6. The straps 6 are preferably fastened to the wood members with nails 7 at the outermost and innermost possible positions on the supporting structural member 10. As shown in FIGS. 15 and 16 the strap can be provided with a central embossment 200 that extends along the longitudinal length of the strap to strengthen the strap.

As best shown in FIGS. 8-13, the upper connection end 12 of the supporting structural member 10 is formed with a support surface 16 that is generally orthogonal to the longitudinal axis 101 of the portal frame 100 and a top surface 17, and the first connection end 52 of the supported structural member 50 is formed with a bearing surface 56 that corresponds to the support surface 16 of the supporting structural member 10 and rests on at least a portion of the support surface 16, and the first connection end 52 of the supported structural member is formed with a top surface 57 that is aligned with and parallel to the top surface 17 of the supporting structural member 10.

As best shown in FIGS. 5-13, the supporting structural member 10 is formed from a plurality of elongated framing members joined together forming first and second layers of members 35 and 36 of equal depth and overlying each other, and the supported structural member 50 is formed from a plurality of elongated framing members joined together forming first and second layers of members 75 and 76 of equal depth and overlying each other. The first layer 75 of the supported structural member 50 extends past the second layer 76 at the connection where the supported structural member 50 and the supporting structural member 10 intersect; and the first layer 35 of the supporting structural member 10 extends past the second layer 36 at the connection where the supported structural member 50 and the supporting structural member 10 intersect.

Figure 18:
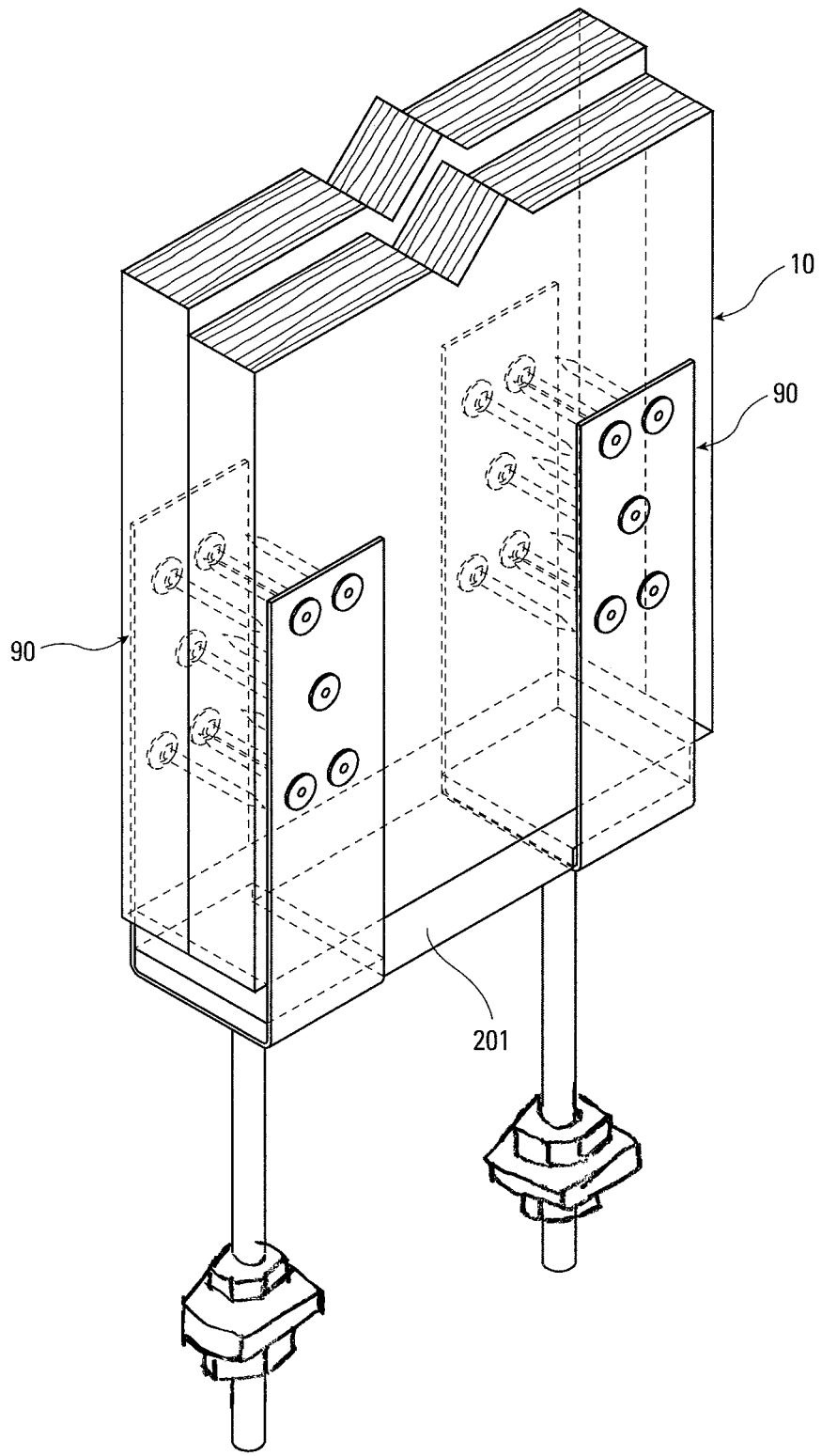
FIG. 18 is a perspective view of a stand-off member, u-shaped anchors and the lower portion of the supporting structural member.

The preferred lateral load resisting member 20 is a nominal 2×12 member made from Douglas Fir or Laminated Veneer Lumber. A nominal 2×10 member can also be used. The lateral load resisting member 20 makes up the first layer 35 of the supporting structural member 10. As shown in FIGS. 15, 16 and 18, the preferred supporting structural member 10 is also made with a second nominal 2×12 member made from Douglas Fir or Laminated Veneer Lumber joined to the lateral load resisting member 20. The second 2×12 member is connected to the lateral load resisting member 20 along its length with spaced screw fasteners 8, such as self-drilling SDW22300 screws available from Simpson Strong-Tie Company, Inc., spaced 12 inches on center along the longitudinal axis 101 and disposed near the lateral sides of the supporting structural member 10. Alternatively, as shown in FIGS. 5 and 6, two posts 27 that are nominally 2" wide or deep along the depth axis 103 of the portal frame 100, are connected to the lateral load resisting member 20 along their lengths with spaced screw fasteners 8, such as self-drilling SDW22300 screws available from Simpson Strong-Tie Company, Inc., spaced 12 inches on center along each post 27. The posts 27 are preferably disposed at the lateral edges of the lateral load resisting member 20. The posts 27 are preferably wood members made from similar materials as the lateral load resisting member 20.

The supported structural member 50 is preferably made of two nominal 2×12 members made from Douglas Fir or Laminated Veneer Lumber connected to each other along their length with spaced screw fasteners 8 or nails, preferably 10 penny nails spaced 16 inches on center along the lateral axis 51 near the top and bottom of the structural supported member 50.

The portal frame connection between a supported structural member 50 and a supporting structural member 10 is formed as follows. The supporting structural member 10 is built up by connecting the posts 27 or other member to the lateral load resisting member 20 with the posts 27 or other member creating the aligned support surface 16 and the lateral load resisting member extending past the aligned support surface 16 to create the lapping surface 14. Similarly, the members of the supported structural member 50 are connected to each other with one of the members extending past the other to create an abutment surface 55 and a lapping surface 54. The supporting structural member 10 is then anchored to the foundation 3. Then, the lapping surfaces 14 and 54, the abutment surfaces 15 and 55 and the support surfaces 16 and the bearing surface 56 are all aligned and set in paired engagement with each other. Then, a plurality of fasteners 8 are driven through the supporting structural member 10 into the supported structural member 50. Preferably these fasteners 8 are driven through the lapping surfaces 14 and 54 in the direction of the depth axis 103 of the portal frame 100. Preferably, eight SDW 22300 screw fasteners 8 are driven through the members in a rectangular arrangement, and an additional 3 fasteners are driven into the supported structural member 50 near the lap joint between the supported structural member 10 and the supporting structural member 50. Oversized washers 9 can be used with the screws. Finally, straps 6 are used to further connect the supported and supporting structural members together. The straps are preferably attached with 10 penny nails.

A portal frame 100, with a connection formed according to the present invention as described above, where the distance between the base 18 of the supporting structural member 10 and the upper longitudinal surface 71 of the supported structural member 50 is a distance of 8 feet and the width 22 of the supported structural member is only 12 inches, when tested according to the ICC-ES Acceptance Criteria AC 130 can resist over 1000 lbs. of force applied to the supported structural member 50 and move laterally less than 0.53 inches. Such a portal frame 100 formed according to the present invention also has a nominal depth along the depth axis 103 of the portal frame 100 of nominal 4" and as such when placed in a standard framed wall will have room for the application of insulation without adding to the thickness of the wall. Straps 6 are very thin and provide little depth to the portal frame 100.

As shown in FIG. 1, the portal frame 100 can be made with only a first side 150 that has a connection between the supported structural member 50 and the supporting structural member 10 that is made according to the present connection. The second side or portion 151 of the portal frame 100 can be made with just a standard post 5 consisting of a single member or built up members supporting the supported structural member 50 with straps 6 making the connection. Alternatively, as shown in FIG. 2, the first and second sides 150 and 151 of the portal frame 100 can be made with connections between a supported structural member 50 and supporting structural members 10 according to the present invention.

As shown in FIG. 1, the connection of the present invention includes an anchor member 90, having an embedment portion 93 disposed within and securely attached to the foundation 3 and a first anchor attachment end 94 protruding from the foundation 3, a supporting structural member 10 attached to the first anchor attachment end 94, and a plurality of fasteners 97 connecting the anchor member 90 to the supporting structural member 10. Preferably, the supporting structural member 10, and even more preferably the lateral load resisting member 20, is directly anchored to the foundation 3 at two separate points disposed laterally from each other along the lateral axis 102 of the portal frame 100.

The anchor member 90 is preferably set in the foundation 3 while the foundation 3 is poured. This allows a one-piece anchor member 90 with a bend or compound curve to be used, creating a strong mechanical interlock between the foundation 3 and the anchor member 90. Setting the anchor member 90 while the foundation 3 is being poured also prevents any space or gaps in the foundation 3 near the anchor member 90. Space between the anchor member 90 and the foundation 3 can allow water to reach the embedment portion 93 of the anchor member 90, where it can have a corrosive effect. Alternatively, the anchor member 90 can be set in the foundation 3 after the foundation 3 is cured. The preferred method for setting the anchor member 90 after the foundation 3 has cured is to drill a hole in the foundation 3 and set a bolt 120 that connects to the anchor member 90 in epoxy or similar compound poured into the hole.

In the preferred embodiment, the anchor member 90 is formed from steel. If such is the case, the preferred fasteners 97 for attaching the first anchor attachment end 94 to the supporting structural member 10 are nails or screws that are self-tapping and self-drilling. Other fasteners 97 can be used such as pins, dowels, rivets or non-self-drilling screws, when holes are pre-drilled in the supporting structural member 10 and the first anchor attachment end 94. A plurality of fasteners 97 are used to create a strong connection. Furthermore, using a plurality of fasteners 97 allows readily available fasteners 97 to be used that do not have to be specifically designed for the present application.

The anchor member 90 is formed in accordance with the loading that will be placed on it and the dimensions of the supporting structural member 10 to which it will attach. Where the loading on the anchor member 90 will be high, as with tall and laterally elongated lateral force resisting systems 1 the anchor member 90 can be made of a better grade and thicker gauge steel.

As is best shown in FIGS. 1, 4, 5 and 9, the connections between the supported structural member 50 and the supporting structural member 10 are reinforced with steel straps 6. The connection between the supported structural member 50 and the posts 5 shown in FIGS. 1, 2 and 9 are also preferably made with steel straps 6. The steel straps 6 preferably able to withstand tension loads greater than 1000 pounds when used with the particular wood members of the portal frame.

As shown in FIGS. 2, 6, 7, 8 and 9, the supported structural member 50 has a lateral width 62 along said lateral axis 102 of said portal frame 100, a longitudinal height 61 along the longitudinal axis 101 of the portal frame 100 and a depth 63 along the depth axis 103 of the portal frame 100 with the lateral width 62 of the supported structural member 50 being far greater than the longitudinal height 61 and the depth 63 of the supported structural member. Similarly, the supporting structural member 10 has a lateral width 22 along the lateral axis 102 of the portal frame 100, a longitudinal height 21 along the longitudinal axis 101 of the portal frame 100 and a depth 23 along the depth axis 103 of the portal frame 100 with the longitudinal height 21 of the supporting structural member 10 being far greater than the lateral width 22 and the depth 23 of the supporting structural member 10.

As shown in FIGS. 15, 16, 17 and 18, the supporting structural member 10 can rest on a stand-off member 201. As shown, the stand-off member 201 can work in conjunction with u-shaped anchoring holdown members or anchors 90. The stand-off member 201 sits on top of the u-shaped anchoring members between the side flanges of the anchoring members. The stand-off member 201 spans the distance between the anchoring members 90. The stand-off member has openings that receive anchor bolts 120 that are embedded in the foundation 3. Nuts 202 on the anchor bolts 120 are held by the stand-off member 201 and prevent the stand-off member from lifting off the anchor bolts 120. The u-shaped anchor members 90 also have openings that receive the anchor bolts 120.

The invention is not limited to the specific form shown, but includes all forms within the definitions of the following claims.

We claim:

1. A lateral force resistance system in a building, the lateral force resistance system comprising;
   a. a foundation of said building;
   b. a supported structural member having an elongated axis with a first connection end and a second connection end disposed oppositely along said elongated axis from said first connection end, said supported structural member being operatively connected to said foundation; and
   c. a supporting structural member also having an elongated axis with an upper connection end and a lower basal end disposed oppositely along said elongated axis from said upper connection end, said supporting structural member being operatively connected to both said supported structural member and said foundation, said elongated supported structural member and said elongated supporting structural member being in direct connection with each other at said first connection end of said supported structural member and said upper connection end of said supporting structural member with the elongated axes of said supported and said supporting structural members being non-parallel, said supported structural member and said supporting structural member forming a first side of a portal frame; wherein
   d. said portal frame has a longitudinal axis that runs parallel to the gravitational forces exerted on said portal frame, a lateral axis orthogonal to said longitudinal axis, said lateral axis of said portal frame being in general alignment with said elongated axis of said supported structural member, and a depth axis orthogonal to both said lateral and longitudinal axes, and said portal frame has a lateral width along said lateral axis, a longitudinal height along said longitudinal axis, and a depth along said depth axis, with said lateral width and said longitudinal height of said portal frame being greater than said depth of said portal frame;
   e. said first connection end of said supported structural member is formed with a substantially planar lapping surface that is not orthogonal to said longitudinal axis of said portal frame, and said first connection end of said supported structural member is formed with a substantially planar abutment surface that is not parallel to said lateral axis of said portal frame;
   f. said supporting structural member has a lateral width along said lateral axis of said portal frame and a longitudinal height along said longitudinal axis of said portal frame, and said supporting structural member is formed with a lateral load resisting member formed from a single piece member that spans said lateral width and extends said longitudinal height, and the supporting structural member is formed from a plurality of elongated framing members joined together forming first and second layers of members of equal depth along said depth axis and overlying each other and one of said first and second layers of members is said lateral load resisting member, and said upper connection end of said supporting structural member is formed with a substantially planar lapping surface that is not orthogonal to said longitudinal axis of said portal frame, and said upper connection end of said supporting structural members is formed with a substantially planar abutment surface that is not parallel to said lateral axis of said portal frame and the substantially planar lapping surface of the supporting structural member and the substantially planar abutment surface of the supporting structural member are both formed on the lateral load resisting member;
   g. said substantially planar lapping surface of said supported structural member and said substantially planar lapping surface of said supporting structural member correspond such that said substantially planar lapping surfaces are disposed adjacent to each other, and said substantially planar abutment surface of said supported structural member and said substantially planar abutment surface of said supporting structural member correspond such that said substantially planar abutment surfaces are disposed adjacent to each other;
   h. wherein the supporting structural member has an inner lateral side and an outer lateral side with the supported structural member extending from the supporting structural member at the inner lateral side and beginning to overlap with the supporting structural member at the inner lateral side, a portion of the supported structural member does not extend past the inner lateral side of the supporting structural member;
   i. the portion of the supported structural member that does not extend past the inner lateral side of the supporting structural member is connected to the supporting structural member with at least one first strap;
   j. wherein the supported structural member has a lower longitudinal side and an upper longitudinal side with the supporting structural member extending from the supported structural member at the lower longitudinal side and beginning to overlap with the supported structural member at the lower longitudinal side, a portion of the supporting structural member does not extend past the lower longitudinal side of the supported structural member and;
   k. wherein the portion of the supporting structural member that does not extend past the lower longitudinal side of the supported structural member is connected to the supported structural member with at least one second strap.

2. The lateral force resisting system of claim 1, wherein:

a. the supporting structural member has an inner lateral side and an outer lateral side with the supported structural member extending from the supporting structural member at the inner lateral side and beginning to overlap with the supporting structural member at the inner lateral side; and
b. the substantially planar abutment surface of the supporting structural member is disposed at the inner lateral side of the supporting structural member.

3. The lateral force resisting system of claim 2, wherein: the lateral load resisting member is directly anchored to the foundation at two separate points disposed laterally from each other along the lateral axis of the portal frame.

4. The lateral force resisting system of claim 2, wherein:
a. the lateral load resisting member is formed with an inner side surface with the supported structural member extending from the lateral load resisting member at the inner side surface;
b. the lateral width of the lateral load resisting member of the supporting structural member is greater than the depth of the portal frame, and
c. the substantially planar abutment surface of the supporting structural member is formed on the inner side surface of the lateral load resisting member.

5. The lateral force resisting system of claim 2, wherein:
a. the upper connection end of the supporting structural member is formed with a substantially planar support surface that is generally orthogonal to the longitudinal axis of the portal frame and a substantially planar top surface, and
b. the first connection end of the supported structural member is formed with a substantially planar bearing surface that corresponds to the substantially planar support surface of the supporting structural member and rests on at least a portion of the substantially planar support surface of the supporting structural member, and the first connection end of the supported structural member is formed with a substantially planar top surface that is aligned with and parallel to the substantially planar top surface of the supporting structural member.

6. The lateral force resisting system of claim 2, wherein:
a. the supporting structural member is formed from a plurality of elongated framing members joined together in face-to-face registration forming first and second layers of members of equal depth and overlying each other, and
b. the supported structural member is formed from a plurality of elongated framing members joined together forming first and second layers of members of equal depth and overlying each other.

7. The lateral force resisting system of claim 1, wherein: the lateral load resisting member is directly anchored to the foundation at two separate points disposed laterally from each other along the lateral axis of the portal frame.

8. The lateral force resisting system of claim 7, wherein:
a. the supporting structural member has an inner lateral side and an outer lateral side with the supported structural member extending from the supporting structural member at the inner lateral side and beginning to overlap with the supporting structural member at the inner lateral side; and
b. the substantially planar abutment surface of the supporting structural member is disposed at the inner lateral side of the supporting structural member.

9. The lateral force resisting system of claim 7, wherein:
a. the lateral load resisting member is formed with an inner side surface with the supported structural member extending from the lateral load resisting member at the inner side surface;
b. the lateral width of the lateral load resisting member of the supporting structural member is greater than the depth of the portal frame, and
c. the substantially planar abutment surface of the supporting structural member is formed on the inner side surface of the lateral load resisting member.

10. The lateral force resisting system of claim 7, wherein:
a. the upper connection end of the supporting structural member is formed with a substantially planar support surface that is generally orthogonal to the longitudinal axis of the portal frame and a substantially planar top surface, and
b. the first connection end of the supported structural member is formed with a substantially planar bearing surface that corresponds to the substantially planar support surface of the supporting structural member and rests on at least a portion of the substantially planar support surface of the supporting structural member, and the first connection end of the supported structural member is formed with a substantially planar top surface that is aligned with and parallel to the substantially planar top surface of the supporting structural member.

11. The lateral force resisting system of claim 1, wherein:
a. the lateral load resisting member is formed with an inner side surface with the supported structural member extending from the lateral load resisting member at the inner side surface;
b. the lateral width of the lateral load resisting member of the supporting structural member is greater than the depth of the portal frame, and
c. the substantially planar abutment surface of the supporting structural member is formed on the inner side surface of the lateral load resisting member.

12. The lateral force resisting system of claim 1, wherein: said substantially planar lapping surfaces of said supporting structural member and said supported structural member are parallel.

13. The lateral force resisting system of claim 1, wherein: said substantially planar abutment surfaces of said supporting structural member and said supported structural member are parallel.

14. The lateral force resisting system of claim 13, wherein: said substantially planar lapping surfaces of said supporting structural member and said supported structural member are parallel.

15. The lateral force resisting system of claim 1, wherein:
a. the upper connection end of the supporting structural member is formed with a substantially planar support surface that is generally orthogonal to the longitudinal axis of the portal frame and a substantially planar top surface, and
b. the first connection end of the supported structural member is formed with a substantially planar bearing surface that corresponds to the substantially planar support surface of the supporting structural member and rests on at least a portion of the substantially planar support surface of the supporting structural member, and the first connection end of the supported structural member is formed with a substantially planar top surface that is aligned with and parallel to the substantially planar top surface of the supporting structural member.

16. The lateral force resisting system of claim 1, wherein:
a. the supporting structural member is formed from a plurality of elongated framing members joined together in face-to-face registration forming first and second layers of members of equal depth and overlying each other, and
b. the supported structural member is formed from a plurality of elongated framing members joined together forming first and second layers of members of equal depth and overlying each other.

17. The lateral force resisting system of claim 5, wherein:
a. the first layer of the supported structural member extends past the second layer at the connection where the supported structural member and the supporting structural member intersect; and
b. the first layer of the supporting structural member extends past the second layer at the connection where the supported structural member and the supporting structural member intersect.

18. The lateral force resisting system of claim 1, wherein:
the supported structural member and the supporting structural member are joined by fasteners that are driven through the substantially planar lapping surfaces of the supported structural member and the supporting structural member.

19. The lateral force resisting system of claim 18, wherein:
the fasteners driven through the substantially planar lapping surfaces of the supported structural member and the supporting structural member are spaced from each other to form a substantially rectangular array.

* * * * *